Figure 1:
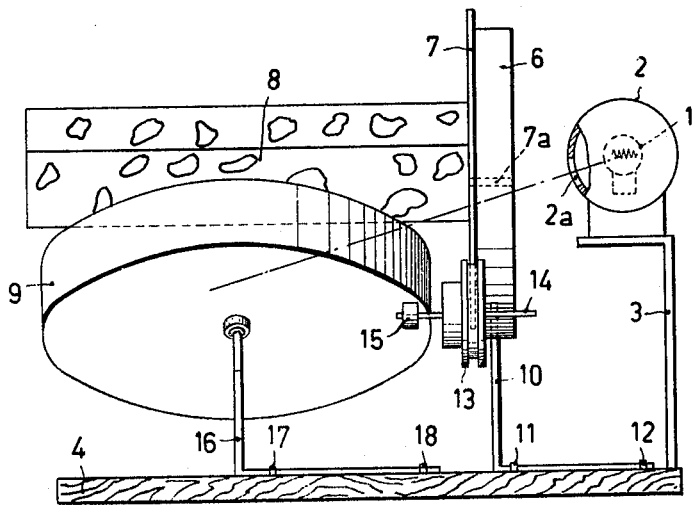

March 22, 1966     N. SCHOFFER     3,242,330
APPARATUS FOR PRODUCING MOVING AND COLOR-CHANGING
DECORATIVE LIGHTING EFFECTS
Filed March 6, 1963     2 Sheets-Sheet 1

INVENTOR.
NICOLAS SCHÖFFER
BY
*Frank R. Dufain*
AGENT

March 22, 1966  N. SCHOFFER  3,242,330
APPARATUS FOR PRODUCING MOVING AND COLOR-CHANGING
DECORATIVE LIGHTING EFFECTS
Filed March 6, 1963  2 Sheets-Sheet 2

INVENTOR.
NICOLAS SCHÖFFER
BY
AGENT

United States Patent Office 3,242,330
Patented Mar. 22, 1966

3,242,330
APPARATUS FOR PRODUCING MOVING AND COLOR-CHANGING DECORATIVE LIGHTING EFFECTS
Nicolas Schoffer, Paris, France, assignor to North American Philips Company, Inc., New York, N.Y., a corporation of Delaware
Filed Mar. 6, 1963, Ser. No. 263,325
Claims priority, application France, Mar. 6, 1962,
890,139
5 Claims. (Cl. 240—10.1)

The invention relates to an apparatus for producing moving and color-changing decorative lighting effects, comprising a source of light, the light of which passes a rotatable body having differently colored transparent and/or reflecting surface parts the light transmitted by said body striking substantially a rotatable member having a plurality of surface parts reflecting light in different directions, from which surface parts the light emanates from the apparatus directly and/or indirectly via one or more further movable members, the surface parts reflecting in different directions being formed by a single piece of light reflecting material having a multiple of irregular facets.

In a known apparatus of the kind set forth the member having a plurality of surface parts reflecting in different directions is formed by sheet material, which has a regular or irregular shape obtained by cutting, bending, pressing, perforating and similar machining.

This machining requires a comparatively high cost of work and because sheet material is used special and precious tools are required to this end, which has an unfavorable effect on the manufacturing costs of such a device.

The invention has for its object to provide measures for obtaining a similar device of a simpler structure, which can be manufactured more cheaply and which exhibits favorable properties with respect to the decorative lighting effects to be obtained.

The device according to the invention is characterized in that the piece of light reflecting material consists of a readily deformable foil-like material, for example a metal foil, in which the irregular facets are provided in the form of creases, the foil-like material being held in a cup-shaped support so that the surface of the foil-like material is larger than the surface of the cup-shaped part of the support and the foil-like material is in contact with this cup-shaped part at a number of places, whereas it is at a distance therefrom at other places.

A foil-like material, for instance a metal foil permits of providing it with creases in a simple manner without the need for special tools, so that a plurality of irregular facets is obtained. The cup-shaped support may have smooth surfaces and can, therefore, also be made in a simple manner.

With a device according to the invention the cup-shaped support is preferably provided at its upper end with a rim bent over towards its axis, the foil-like material being anchored behind this edge.

The said re-entrant rim permits of fastening the sheet-like material in a simple manner in the cup-shaped support by pressing this material into the support and by causing it to snap behind said re-entrant rim.

In principle this provides a very simple method of manufacturing a member having a plurality of surface parts reflecting light in different directions.

The invention, therefore, also relates to a method of manufacturing such a member and in accordance with the invention this method is characterized in that starting from a flat easily deformable foil-like material having a larger surface than the surface of a cup-shaped part of a support, this material is disposed on the entrance opening of said cup-shaped part, into which it is pressed so that it is creased and comes into contact with the cup-shaped part at a plurality of places, whereas it remains at a distance therefrom at other places.

The invention will now be described with reference to the accompanying drawing, which shows diagrammatically an embodiment of the device according to the invention.

Figure 2:
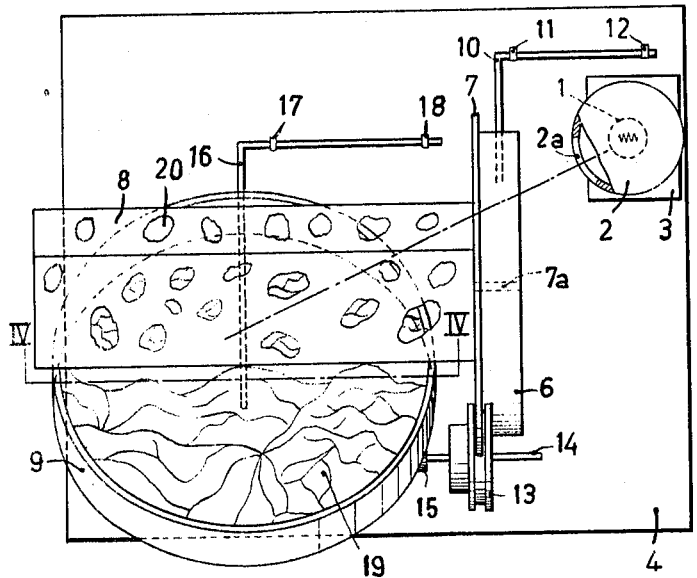
Figure 3:
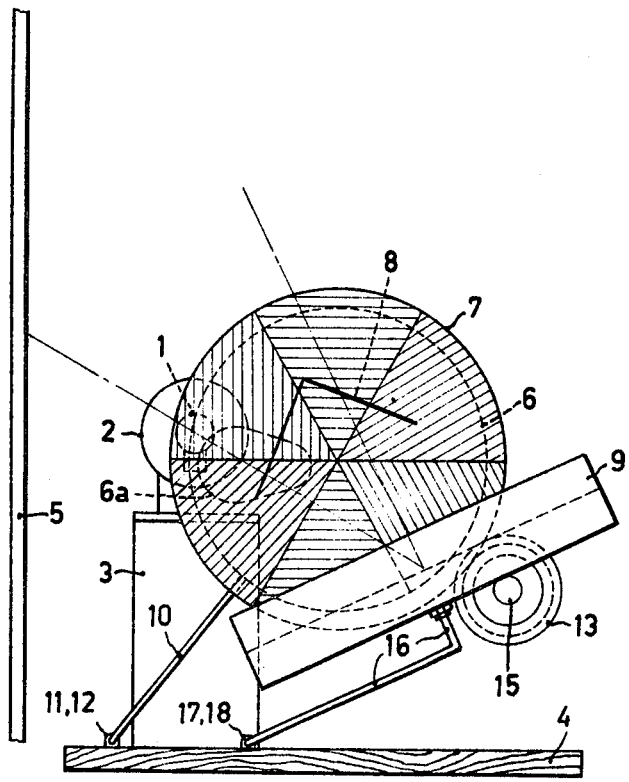
Figure 4:
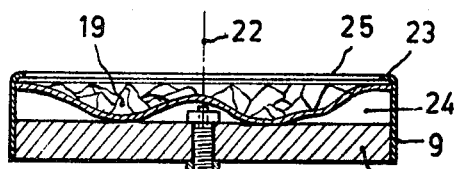

FIG. 1 is a front elevation of the device of FIG. 2.
FIG. 2 is a plan view of said device.
FIG. 3 is a side elevation of the device of FIG. 1.
FIG. 4 is a sectional view of part of the device of FIG. 2 along the line IV—IV in said figure.

Referring to FIGS. 1 to 3 reference numeral 1 designates a source of light formed by an incandescent lamp. This lamp is arranged in a housing 2 having an opening 2a, from which the light of theincandescent lamp 1 can emanate. The housing 2 is disposed on a support 3, which is mounted on a base plate 4, which supports the whole device to be described hereinafter. The base plate 4 is arranged behind a transparent, frosted screen 5, on which the decorative light effects produced by the device are rendered visible, which can be observed on the opposite side.

The light beam emanating from the opening 2a strikes a stationary screen 6, which is blackened in order to avoid reflections. The screen 6 is provided with an opening 6a of a suitable shape for limiting the light beam. The light of the beam emanating through the opening 6a passes through a rotating disc 7 having differently colored sectors and then strikes substantially a rotatable member 9 having a plurality of surface parts 19, reflecting in different directions. Part of the light passing through the sectors of the disc 7 can strike a member 8, fastened to said disc, in accordance with the position occupied by the disc. The member 8 consists of an elongated, light-reflecting screen, the axis of which is parallel to the axis of the disc 7 and which is provided with a plurality of irregularly distributed apertures 20 of different shapes and sizes. The light reflected by the member 8 strikes directly the screen 5 and the light passing through the aperture 20 is projected via the member 9 onto the screen 5. Also the light emanating directly from the sectors of the disc 7 and incident on the member 9 is reflected towards the screen 5 by said member either directly or again via the member 8 in accordance with the position thereof.

The disc 7 is rotatably journalled on a shaft 7a, which is supported from the stationary screen 6. This screen 6 is supported from a support 10, which is fastened to the base plate 4 by means of pivot eyelets 11 and 12. The disc 7 bears by its own weight and by the weight of the screen 6 with its periphery on a friction wheel 13, which is seated on a shaft 14. This shaft 14 may be driven by a motor (not shown), if desired with the interposition of a speed-reducing transmission. The shaft 14 is also provided with a friction wheel 15 having a diameter differing from that of the wheel 13. The wheel 15 supports the member 9, which bears thereon by its own weight and which is rotatably journalled on a shaft 16. The shaft 16 is bent over at right angles and the bent-over portion is fastened to the base plate 4 by means of pivot holes 17 and 18, so that the shaft 16 is adapted to pivot about this bent-over portion.

The device described above permits of producing moving and color-changing decorative lighting effects and of projecting them on the screen 5.

The member 9 used in this device is shown separately in a sectional view in FIG. 4. It consists of a cup-shaped, cylindrical support 21, the axis of revolution of which is denoted by 22. The axis 22 coincides with the shaft 16 of the FIGS. 1 to 3 which shaft is also shown in FIG. 4. The cup-shaped support 21 is provided at its upper end with a rim 23 bent over towards its axis. The cup-shaped part 24 of the support 21 has a plurality of irregular surface parts 19, reflecting light in different directions. These surface parts form each a portion of a single reflecting surface which consists, in accordance with the invention, of a readily deformable foil-like material, for example a metal foil or a metallized synthetic substance foil, in which the irregular surface parts 19 are provided in the form of creases.

In the method according to the invention the reflecting surface parts 19 can be obtained in a simple manner by starting from a flat, readily deformable foil-like material having a larger surface than the surface of the cup-shaped part of the support 21. This foil-like material is disposed on the entrance opening 25 of the said cup-shaped part and pressed inwardly, for example by hand. Thus creases are produced in the sheet material so that the material comes into contact with the cup at a number of places, whereas it remains at a distance therefrom at other places. The facets of the member 9 thus obtained by means of the creases, have the advantage that the moving, color-changing, decorative lighting effects obtained on the screen 5 are smoothly mixed. Sharp contrasts do not occur.

The re-entrant rim 23 of the cup-shaped support has the advantage that the sheet material, after having been pressed into the cup, can snap behind said rim, so that it is anchored in the cup in an effective manner.

What is claimed is:

1. Apparatus for producing moving light patterns on a screen comprising a display screen, a source of light rays, means including a rotatable body having different color transparent panels in the path of said light rays for transmitting said light rays, means including a rotatable light reflecting screen in the path of said transmitted light rays for reflecting light toward said display screen, said light reflecting screen having a plurality of irregularly distributed irregular apertures therein for passing light rays therethrough, and a rotatable member in the path of said light passing through said apertures, said rotatable member having an irregular undulating reflecting surface for reflecting said rays in different directions onto said display screen and onto said light reflecting screen.

2. Apparatus according to claim 1 wherein said light reflecting screen comprise a generally V-shaped member having said apertures in each leg of said V.

3. Apparatus according to claim 1, wherein said means including a rotatable body having said color panels, comprises a stationary blackened screen having an aperture therethrough for passing said light rays onto said rotatable body.

4. Apparatus according to claim 1 wherein said rotatable member having a reflecting surface comprises a generally cup-shaped supporting member, a single piece of light reflecting material substantially within the hollow of said supporting member, said material having a larger surface area than the corresponding surface area of said support member, said material having a plurality of irregular facets defining said irregular undulating surface.

5. Apparatus according to claim 4 wherein said support member has an inwardly bent rim for retaining said material within said hollow.

References Cited by the Examiner

UNITED STATES PATENTS

| 738,707 | 9/1903 | Van Nort | 240—3.1 |
| 1,406,663 | 2/1922 | Lovstrom | 240—3.1 X |
| 2,673,806 | 3/1954 | Colman | 229—3.5 X |
| 2,811,798 | 11/1957 | Brooks. | |
| 2,907,873 | 10/1959 | Smith | 240—103 |
| 3,080,474 | 3/1963 | Allen | 240—10.1 |
| 3,119,565 | 1/1964 | Nottingham | 240—10.1 |

OTHER REFERENCES

"Reynolds Wrap Pure Aluminum," publication, copyright 1948, Reynolds Metals Co., Richmond, Virginia, received in U.S. Patent Office December 15, 1959.

NORTON ANSHER, *Primary Examiner.*

EVON C. BLUNK, *Examiner.*